United States Patent
Boehnke

(10) Patent No.: US 6,696,671 B2
(45) Date of Patent: Feb. 24, 2004

(54) DEVICE FOR HEATING A MELTABLE MATERIAL

(75) Inventor: Christian Boehnke, Münster (DE)

(73) Assignee: Ing. Walter Hengst GmbH & Co. KG, Munster (DE)

(*) Notice: Subject to any disclaimer, the term of this patent is extended or adjusted under 35 U.S.C. 154(b) by 0 days.

(21) Appl. No.: 10/069,820

(22) PCT Filed: Jun. 28, 2001

(86) PCT No.: PCT/DE01/02335

§ 371 (c)(1),
(2), (4) Date: Jun. 21, 2002

(87) PCT Pub. No.: WO02/00407

PCT Pub. Date: Jan. 3, 2002

(65) Prior Publication Data

US 2002/0162832 A1 Nov. 7, 2002

(30) Foreign Application Priority Data

Jun. 28, 2000 (DE) .......................... 100 31 447

(51) Int. Cl.⁷ .............. F27B 9/28; F27B 9/36; B29B 13/08
(52) U.S. Cl. .......... 219/388; 219/405; 219/411; 392/483
(58) Field of Search .............. 219/388, 405, 219/406, 421, 424; 392/411, 416, 418, 479, 480, 483

(56) References Cited

U.S. PATENT DOCUMENTS

| | | | |
|---|---|---|---|
| 3,218,430 A | 11/1965 | Bayerl et al. | 219/10.65 |
| 3,413,441 A | 11/1968 | Isobe et al. | 219/390 |
| 4,600,375 A | 7/1986 | Honsho et al. | 425/174.4 |
| 4,914,276 A * | 4/1990 | Blair | 219/390 |
| 5,559,924 A * | 9/1996 | Kadotani et al. | 392/483 |
| 6,072,164 A | 6/2000 | Tate et al. | 219/497 |

FOREIGN PATENT DOCUMENTS

| | | |
|---|---|---|
| DE | 19 55 598 A | 5/1971 |
| JP | 60 157813 A | 8/1985 |

* cited by examiner

*Primary Examiner*—Joseph Pelham
(74) *Attorney, Agent, or Firm*—Lahive & Cockfield, LLP

(57) ABSTRACT

With reference to a device for heating a meltable material, such as plastic, upstream from equipment for further processing, such as casting or extrusion equipment, which device includes a conveyor channel for the material and a heating means located outside the conveyor channel, the heating means being designed as a radiant heating means and the thermal radiation being directed onto the conveyor channel, the invention proposes that the conveyor channel consist of a material which completely or partially absorbs the thermal radiation.

11 Claims, 1 Drawing Sheet

DEVICE FOR HEATING A MELTABLE MATERIAL

This application is a 35 U.S.C. 371 national stage filing of, and claims priority to, International Application No. PCT/DE01/02335, filed Jun. 28, 2001, which in turn claims priority to German Patent Application No. 100 31 447.3 filed on Jun. 28, 2000 in Germany. The contents of the aforementioned applications are hereby incorporated by reference.

BACKGROUND OF THE INVENTION

The invention relates to a device for heating a meltable material.

Both in the metal-processing as well as the plastic-processing industry, a known method is to heat equipment used for melting, heat-retention or conveyance by disposing heating elements to abut the housings of this equipment. This method of heating is advantageous since transference of heat through direct contact, that is, through thermal conduction, is very efficient.

In practice, however, problems frequently occur due to the fact that, depending on thermal expansion conditions, gaps may be created between the heating elements and the individual housings, with the result that the thermal conductivity between the heating elements and the housings is considerably impaired. Additionally, depending on the temperature level reached, oxidation phenomena may appear on the housing or the surface of the heating elements, and these oxidation coatings may also significantly degrade thermal conductivity.

Aside from the fact that heating efficiency may be degraded due to the problems outlined above, the controllability of heating output, in other words, the ability to set a desired temperature within the heated material, may also be impaired by the above-mentioned problems such that often the entire process control, and thus the output from the downstream equipment, may be diminished.

U.S. Pat. No. 4,600,375 discloses a device for melting and conveying by thermal radiation. Here a resin is melted in a glass tube. Since the glass tube is transparent to the thermal radiation, in other words is permeable to it, the thermal radiation acts directly on the resin undergoing the heating. This device according to the species is not suited for processing metals.

The goal of the invention is to improve the device so as to enable this device to be used for melting metals as well.

SUMMARY OF THE INVENTION

The invention, in other words, offers the surprising proposal wherein a thermal radiation source is used as a heating device but the material for melting is not heated directly by using thermal radiation which passes through the conveyor channel, but indirectly. To achieve this, the conveyor channel does not completely absorb, or only partially absorbs, the thermal radiation, with the result that the heating of the material is effected not directly—or not only directly—by the thermal radiation but by thermal transfer from the conveyor channel to the material.

The absorption of radiation results in a smoothing out of the transfer of heat into the metal since an undesirably high percentage of the thermal radiation impinging on the metal, such as occurs during indirect radiant heating, may possibly be reflected—with the result that the efficiency of the heating process is degraded. In addition, since the conveyor channel is not transparent to thermal radiation, it may readily consist of a material which, unlike glass, does not react with the metal or molten metal at high temperatures and wear out.

The heating of the conveyor channel itself is by radiant energy, an advantageous approach which avoids the above-mentioned disadvantages of crack formation or coating formation. The wavelength utilized may, for example, be the infrared or a wavelength closely adjacent to the infrared. The inertialess, because massless, transmission of heat in the form of thermal radiation additionally allows the temperature to be quickly and precisely adjusted. The heating elements may, for example, be appropriately take the form of a heating filament, discharge lamp, or be otherwise adapted to the specific operating conditions.

Since the conveyor channel absorbs thermal radiation, it heats up and thereby heats the transported material requiring heating. It is similarly possible to select a material for the conveyor channel which achieves both a partial transparency to radiation as well as a partial absorption of radiation, for example, so as to be able to utilize a material of especially high durability.

The heating means is located "outside" the conveyor channel, meaning that there is a separation between the heating means and the material to be transported and heated. However, this does not mean, for example, that given a circular geometry for the device the configuration must necessarily extend radially outward from the conveyor channel.

The conveyor channel may be advantageously designed as a tube which completely surrounds the conveyed material such that the material is shielded from undesirable extraneous effects. The radiant heating means may be advantageously arranged to completely surround such a tube so as to act on the conveyor channel from all sides, thus producing an intensive, encompassing and uniform heating of the heated material. Compared with a similarly conceivable geometry for a conveyor channel with an annular cross-section in which the heating means is located inside this annular cross-section, a configuration with a heating means acting radially from outside results in a larger surface on which the radiant heat can act such that the transfer of a higher heat output is promoted. Depending on requirements, the heating means may be located both inside as well as outside this annular cross-section to produce an especially intense action of the radiant energy.

A partition wall may be advantageously provided between the heating means and the conveyor channel, which partition wall is transparent to the thermal radiation, that is, permits nearly unobstructed heating of the conveyor channel, but which prevents convection, that is, the transfer of heat by the movement of air or gas. This approach creates a zone which is maintained at as cool a level as possible in which to locate the radiators, that is, the sources of thermal radiation, so as to reliably prevent them from overheating. At the same time, the partition wall permits the thermal intensity in the region of the conveyor channel to be maintained at as high a level as possible.

Another function of the partition wall may be to employ a specific atmosphere within the region of the conveyor channel or in the region of the radiation sources, which atmosphere is advantageous for the mechanical or thermal stability of the conveyor channel or the radiation sources—with the result that these components will exhibit an especially long useful life during operation.

With the aim of keeping the temperature level in the region of the conveyor channel as high as possible, and thus prevent heat losses, the partition wall may have the advantageous feature of being transparent to radiation on one side and reflecting in the other direction, these characteristics being adapted to the specific wavelengths at which the thermal radiation, on the one hand, emanates from the heat sources and, on the other hand, is reflected by the conveyor channel or heated material. In this way, the thermal radiation is allowed first to pass essentially unobstructed through the partition wall while the reflected radiation is then essentially retained by the partition wall and reflected into the region of the conveyor channel or material.

The heating means may be advantageously encircle the conveyor channel in an annular or helical pattern. Unlike other, for example, meander-shaped patterns, this design results in an essentially homogenous distribution of the thermal radiation, and thus in a homogenous distribution of temperature.

Heating may be advantageously differentiated by section in order to adjust the heating requirement over the length of the conveyor channel, for example, to allow first for melting zones and then heat-retention zones for the already-heated material within the conveyor channel.

The conveyor channel may be advantageously located completely within a closed housing. This feature permits a specific atmosphere to be employed within this housing, for example by evacuating the housing using inert gas or the like, which approach ensures the optimum stability of the conveyor channel, the term stability being understood to refer especially to the surface properties of the conveyor channel, such that these thermal-radiation-absorbing properties may be maintained as reliably as possible while ensuring a long useful life for the conveyor channel. By employing a suitable material, this housing may simultaneously include the functions of the above-mentioned partition wall.

The partition wall may be advantageously fabricated from quartz glass since this material offers an advantageously high temperature stability and simultaneously an advantageously high transparency to thermal radiation. In order to provide the desired reflection characteristics, this quartz glass may be surface-treated, for example, provided with a coating.

Reflectors may be advantageously provided which reflect the thermal radiation from the heat sources to the conveyor channel so as to minimize heat losses and enhance the intensity of the heat acting on the conveyor channel.

BRIEF DESCRIPTION OF THE DRAWINGS

Two embodiments of the invention are explained in more detail based on the drawing.

DESCRIPTION OF ILLUSTRATED EMBODIMENT

Figure 1:
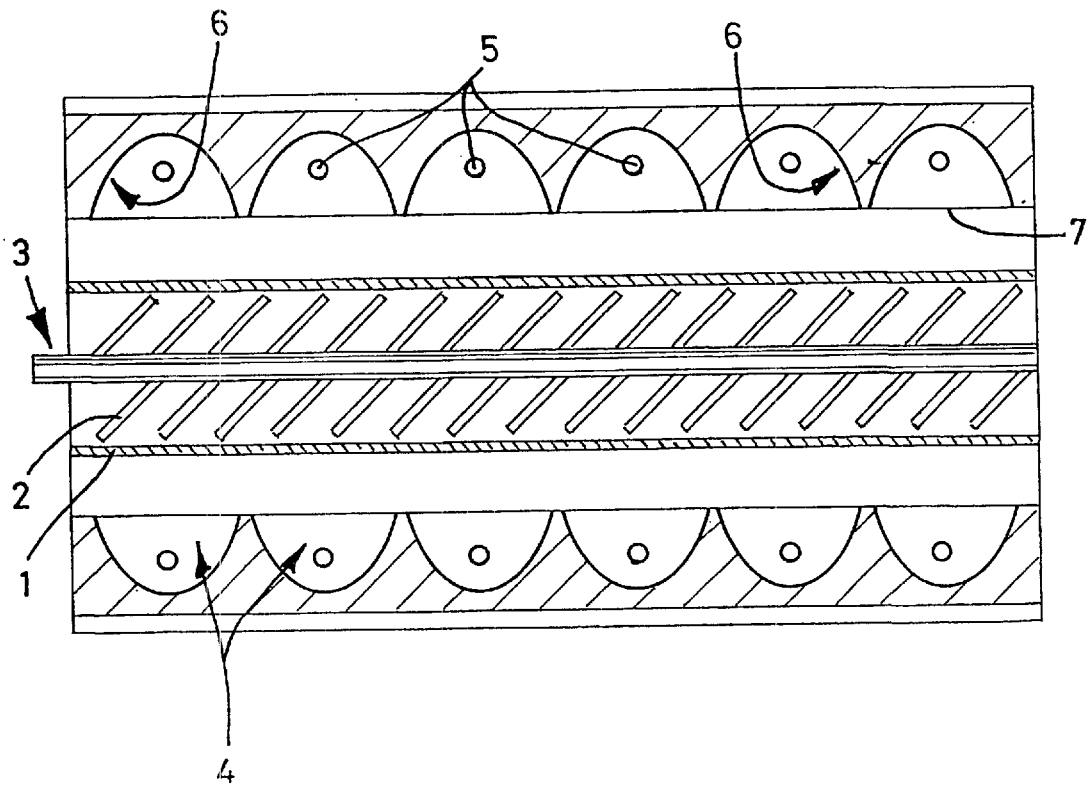
FIG. 1 shows a first embodiment.

Reference 1 in FIG. 1 identifies a conveyor channel which has a tubular shape and in which is located a conveying means 2, said conveying means being indicated only schematically and being set in motion by a driven shaft 3 so as to move material located in conveyor channel 1 through conveyor channel 1.

Depending on the conveyed material and the temperature level required, conveyor channel 1 may consist of various materials, for example, ceramic, mineral or metallic materials, or of mixtures thereof. The conveyor is heated by a heating means 4, heating means 4 including heating elements 5 which are arranged in an annular or helical pattern around conveyor channel 1 and direct the thermal radiation to conveyor channel 1. Reflectors 6 redirect forwards that portion of the radiation directed backwards, that is, toward conveyor channel 1, so as to reduce losses of thermal radiation.

Conveyor channel 1 is located in a housing 7 which simultaneously forms a partition wall between conveyor channel 1 and heating means 4. Like conveyor channel 1, housing 7 is also of a tubular shape. It consists of quartz glass. The quartz glass is coated in such a way that the thermal radiation from heating elements 5 may pass nearly unobstructed through housing 7 to conveyor channel 1, while the heat radiated by conveyor channel 1 is again reflected inwards by housing 7 toward conveyor channel 1.

An inert gas atmosphere is provided inside housing 7 so as to preclude, in the case of a metallic conveyor channel 1, any oxidation of the surface of conveyor channel 1 even when heated to high temperatures, and consequently any formation of discolorations or oxide coatings which could diminish the ability of conveyor channel 1 to absorb heat.

In addition, housing 7 forms a thermal barrier so that, within housing 7, a high temperature level may be maintained around conveyor channel 1, while outside housing 7 the temperature level remains low; in fact, the region outside housing 7 may be cooled, as required, to prevent heating elements 5 from overheating.

Housing 7 shown here only schematically may be of a double-wall design so that a vacuum may be provided between the two walls to enhance the thermal insulating efficiency of housing 7.

Heating elements 5 of heating means 4 may be differentially controllable, either by section or by group, so as to allow different temperature zones to be set along the length of conveyor channel 1 or to allow the radiant intensities of the individual heating elements 5 to be differentially adjusted according to the specific heating requirement in order to maintain a constant temperature.

Figure 2:
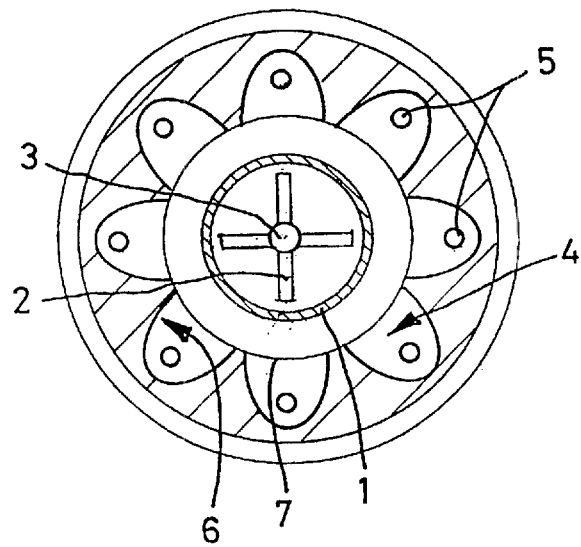
FIG. 2 shows a second embodiment of a device for heating a meltable material.

FIG. 2, on the other hand, illustrates an embodiment in the form of a section through a device similar to that in FIG. 1. The cross-section reveals, however, that the heating elements 5 do not extend radially, or at least essentially radially, around housing 7—as is the case with the embodiment of FIG. 1—but extend instead longitudinally, or at least essentially longitudinally, in the direction of conveyor channel 1. The embodiment of FIG. 2 may in certain cases enhance the ease of fabrication for the entire device. Heating elements 5 may include multiple individually heatable sections arranged in tandem so as to permit the above-mentioned adjustability individually by section of the heating effect on conveyor channel 2 in this embodiment as well.

In place of elongate heating elements, such as those shown in FIG. 1 which are bent in an annular shape and those in FIG. 2 of a rod-like shape, heating elements of a flat type may be provided, or those of a point-type design, for example, heating elements similar to incandescent bulbs. The form of the reflectors may be advantageously adapted to the form of the heating elements, for example, channel-shaped or elongate; or channel-shaped and annular; or cup-shaped surrounding the point-type heating elements.

What is claimed is:

1. Device for heating a meltable material upstream from equipment for subsequent processing including a conveyor channel for the meltable material and a heater located outside the conveyor channel, the heater being configured as a radiant heater capable of generating thermal radiation directed to the conveyor channel, wherein the conveyor channel comprises a material which at least one of completely and partially absorbs the thermal radiation.

2. Device according to claim 1, wherein the conveyor channel has a tubular shape and the thermal radiation generated by the radiant heater is directed radially onto the tube.

3. Device according to claim 1, wherein the heater is separated from the conveyor channel, and disposed between the conveyor channel and the heater is a thermal-radiation-transparent partition wall.

4. Device according to claim 3, wherein the partition wall is configured as a thermal barrier such that the temperature on the side of the partition wall where the heater is located is lower than on the side of the partition wall where the conveyor channel is located.

5. Device according to claim 3, wherein the partition wall is at least one of highly transparent to the thermal radiation impinging on it from the heater and highly reflective of the thermal radiation reflected by the conveyor channel.

6. Device according to claim 1, wherein the heater encircles the conveyor channel in an annular or a helical pattern.

7. Device according to claim 1, wherein the heater comprises two or more sections, the heating output of which is separately controllable.

8. Device according to claim 1, wherein the conveyor channel is located in a housing in which there is an atmosphere conducive to the stability of the conveyor channel.

9. Device according to claim 3, wherein the partition wall comprises quartz glass.

10. Device according to claim 1, further comprising reflectors are arranged so as to reflect the thermal radiation from the heater to the conveyor channel.

11. Device according to claim 8, wherein the housing comprises quartz glass.

* * * * *